(12) United States Patent
Acharya

(10) Patent No.: US 6,236,765 B1
(45) Date of Patent: *May 22, 2001

(54) DWT-BASED UP-SAMPLING ALGORITHM SUITABLE FOR IMAGE DISPLAY IN AN LCD PANEL

(75) Inventor: Tinku Acharya, Tempe, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,728

(22) Filed: Aug. 5, 1998

(51) Int. Cl.[7] .................................................. G06K 9/36
(52) U.S. Cl. .................... 382/276; 382/298; 375/240.12; 375/240.21
(58) Field of Search ................................. 382/232, 233, 382/235, 240, 248, 250, 276, 298, 299, 300; 348/398, 420, 218; 375/286, 240.12, 240.21

(56) References Cited

U.S. PATENT DOCUMENTS

| | | | |
|---|---|---|---|
| 5,014,134 | * 5/1991 | Lawton et al. | 358/261.3 |
| 5,321,776 | * 6/1994 | Shapiro | 382/56 |
| 5,392,255 | * 2/1995 | Lebras et al. | 367/50 |
| 5,491,561 | * 2/1996 | Fukuda | 358/342 |
| 5,602,589 | * 2/1997 | Vishwanath et al. | 348/398 |
| 5,706,220 | * 1/1998 | Vafai et al. | 364/724.05 |
| 5,737,448 | * 4/1998 | Gardos | 382/240 |

* cited by examiner

Primary Examiner—Leo Boudreau
Assistant Examiner—Kanji Patel
(74) Attorney, Agent, or Firm—Blakely, Sokoloff, Taylor & Zafman LLP

(57) ABSTRACT

A method comprising constructing virtual (Discrete Wavelet Transform) DWT sub-bands; from an image without performing the DWT and then applying an inverse DWT upon the virtual sub-bands, the result of the inverse DWT representing an up-sampled version of the image. Alternatively, an apparatus comprising an interface configured to communicate image data, and an up-sampling unit, the up-sampling unit coupled to the interface to receive the image data, the up-sampling unit configured to construct virtual sub-band input data from the image data, the up-sampling unit configured to perform an inverse DWT upon the input data generating an up-sampled image therefrom. In an alternate embodiment, an apparatus comprising a computer readable medium having instructions which when executed perform constructing virtual (Discrete Wavelet Transform) DWT sub-bands from an image without performing the DWT, applying an inverse DWT upon the virtual sub-bands, the result of the inverse DWT representing an up-sampled version of the image.

28 Claims, 7 Drawing Sheets

DWT-BASED UP-SAMPLING ALGORITHM SUITABLE FOR IMAGE DISPLAY IN AN LCD PANEL

BACKGROUND OF THE INVENTION

1. Field of the Invention

The invention relates generally to image processing and computer graphics. More specifically, the invention relates to up-sampling or up-scaling of an image.

2. Description of the Related Art

In the art of imaging, it may be desirable to resize an image. Particularly, it may be desirable to scale up (up-sample) an image to make it larger if the image is too small for its intended use or application. For instance, a digital camera may capture an image in a small size of M pixel rows by N pixel columns. If the image is to be printed, it may be desirable to scale the image to R pixel rows by S pixel columns (R>M and/or S>N) such that the image covers the print area. In some digital cameras, a display panel such as an LCD (Liquid Crystal Display) is provided so that users can review in a quick fashion the pictures they have already taken or the contents of the picture they are about to take (i.e. what is in the focus area of the camera). The LCD panel, like any CRT (Cathode Ray Tube) monitoring device has a maximum resolution that it can support, but unlike a CRT, the resolution cannot be modified by the supporting video sub- system (i.e. graphics card). For instance, in a CRT device, a maximum resolution of 640 pixels by 480 pixels also implies that lower resolutions could be provided with very little loss in visual quality. However, in a LCD panel, since there are a fixed number of very discretely observable pixels, an attempted change in resolution usually results in a highly blurred image.

When an image needs to be scaled-up or up-sampled, where the image size is increased, the degradation due to blurring and blocking in a LCD panel is severe. For instance, consider an image that is 100 by 100 pixels in size. If an LCD panel on which the image is to be displayed is 200 by 200 in its screen size in terms of fixed pixels available, then only one-quarter of the available screen is being utilized. If it is desired that the entire screen be utilized for displaying the image, then the image needs to be scaled-up by a 2:1 ratio.

One simple and traditional way of up-sampling is to merely "duplicate" pixels as needed. In this case, since a 2:1 up-sampling is desired, each pixel could be repeated three additional times such that the information that occupied one pixel, now occupies four pixels in a two-by-two block. This "fill" approach has clear speed advantages over any other method of up-sampling since no computation or image processing is involved. However, this approach guarantees that the resulting scaled image is fuzzier, less sharp and "blocky" where individual pixel squares are more readily discernible to the eye. Importantly, the scaled result will have edge features, which are critical to human perception of any image, that are also more blocky and less sharp.

One traditional means of increasing the quality of the scaled-up image has been to use bi-linear interpolation. If a two to one up-sampling is desired then each pixel in the original image should be replaced by a block of four pixels. Consider, for example, the following original image:

$$X_A \quad X_B \quad X_C \quad \ldots$$
$$X_D \quad X_E \quad X_F$$
$$\vdots$$

A bi-linear interpolation would average in two different directions to determine the scaled image data set. The scaled image under a bi-linear interpolation method may consist of:

$$X_A \frac{X_A + X_B}{2} X_B \frac{X_B + X_C}{2} X_C \ldots$$

$$\frac{X_A + X_D}{2} X_A + X_B + X_D + \frac{X_E}{4} \ldots$$

$$X_D \frac{X_D + X_E}{2} X_E \ldots$$

If the original image is a size M×N, then the scaled image would be of size M*N*4 in terms of total number of pixels in the respective data sets. This and other averaging methods may yield better results than filling, but still results in blurred details and rough edges that are not smoothly contoured on the image.

Typical up-sampling techniques are inadequate and lead to poor image quality. Thus, there is a need for a up-sampling technique that better preserves image quality. Further, since lower cost of computation, in terms of complexity, is crucial in devices such as digital cameras, the up-sampling technique should also be compute efficient, so that it can be utilized in such applications.

SUMMARY OF THE INVENTION

What is disclosed is a method comprising constructing virtual (Discrete Wavelet Transform) DWT sub-bands from an image without performing the DWT and then applying an inverse DWT upon the virtual sub-bands, the result of the inverse DWT representing an up-sampled version of the image. Alternatively, disclosed is an apparatus comprising an interface configured to communicate image data, and an up-sampling unit, the up-sampling unit coupled to the interface to receive the image data, the up-sampling unit configured to construct virtual sub-band input data from the image data, the up-sampling unit configured to perform an inverse DWT upon the input data generating an up-sampled image therefrom. In an alternate embodiment, what is disclosed is an apparatus comprising a computer readable medium having instructions which when executed perform constructing virtual (Discrete Wavelet Transform) DWT sub-bands from an image without performing the DWT, applying an inverse DWT upon the virtual sub-bands, the result of the inverse DWT representing an up-sampled version of the image.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
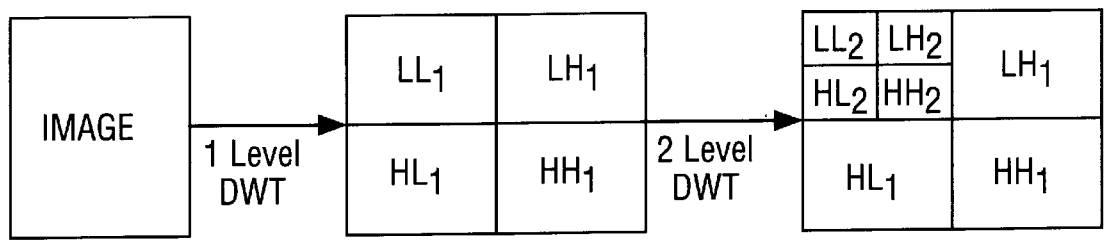
FIG. 1 illustrates the sub-band(s) resulting from a forward DWT operation upon an image.

Up-sampling of an image is achieved, according to one embodiment of the invention, by applying an inverse Discrete Wavelet Transform (DWT) upon an image after approximating values for "virtual sub-bands" belonging to the image. FIG. 1 illustrates the sub-band(s) resulting from a forward DWT operation upon an image. The DWT is a "discrete" algorithm based upon Wavelet theory which utilizes one or more "basis" functions that can be used to analyze a signal, similar to the DCT (Discrete Cosine Transform) based upon sinusoidal basis functions. Advantageously, the DWT is better suited to representing edge features in images since Wavelets by nature are periodic and often jagged. The DWT approximates an input signal by discrete samples of a full continuous wavelet. Thus, with these discrete sample points, the DWT can be thought of as also being a filtering operation with well-defined coefficients. Unlike the Fourier transforms or averaging filters, the Wavelet coefficients can be selected to suit particularly the application, or type of input signal. The DWT chosen in at least one embodiment of the invention for image scaling is known as the 9–7 bi-orthogonal spline filters DWT. Since the DWT is discrete, the DWT can be implemented using digital logic such as Very Large Scale Integration (VLSI) circuits and thus can be integrated on a chip with other digital components. Where a imaging device or camera already utilizes a DWT for image compression, an inverse DWT can easily be implemented in the same device with little additional overhead and cost. The ability of the DWT to better approximate the edge features of an image make it ideal for an up-sampling application. It is advantageous over interpolation-type scaling in that visually essential image features can be better reconstructed in the scaled-up image. Further, as shown and described below, an architecture for DWT-based up-sampling can be implemented efficiently for high data throughput, unlike Fourier or averaging techniques which require multiple cycles or iterations to generate a single output datum.

The essence of what is known commonly as a two-dimensional DWT is to decompose an input signal into four frequency (frequency refers to the high-pass (H) or low-pass (L) nature of the filtering) sub-bands. The two-dimensional DWT creates four sub-bands, LL, LH, HL and HH, with the number of data values in each one-quarter of the input data. The DWT is multi-resolution technique such that the result data from one iteration of the DWT may be subjected to another DWT iteration. Each "level" of resolution is obtained by applying the DWT upon the "LL" sub-band generated by the previous level DWT. This is possible because the LL sub-band contains almost all essential image features and can be considered a one-quarter scaled version of the previous level LL sub-band (or the original full image in a one-level DWT). With this capability of the DWT, each sub-band can further be divided into smaller and smaller sub-bands as is desired.

Each DWT resolution level k has 4 sub-bands, $LL_k$, $HL_k$, $LH_k$ and $HH_k$. The first level of DWT resolution is obtained by performing the DWT upon the entire original image, while further DWT resolution is obtained by performing the DWT on the LL sub-band generated by the previous level k-1. The $LL_k$ sub-band contains enough image information to substantially reconstruct a scaled version of the image. The $LH_k$ $HL_k$ and $HH_k$ sub-bands contain high-frequency noise and edge information which is less visually critical than that resolved into and represented in the $LL_k$ sub-band.

In general, level K sub-band(s) have the following properties (if K=1, $LL_o$ refers to the original image):

$LL_k$—contains a one-quarter scaled version of the $LL_{k-1}$ sub-band.

$LH_k$—contains noise and horizontal edge information from the $LL_{k-1}$ sub-band image.

$HL_k$—contains noise and vertical edge information from the $LL_{k-1}$ sub-band image.

$HH_k$—contains noise and diagonal edge information from the $LL_{k-1}$ sub-band image.

The property of the DWT which allows most information to be preserved in the $LL_k$ sub-band can be exploited in performing up-sampling of an image. The DWT is a unitary transformation technique for multi-resolution hierarchical decomposition which permits an input signal that is decomposed by a DWT can be recovered with little loss by performing an inverse of the DWT. The coefficients representing the "forward" DWT described above have a symmetric relationship with coefficients for the inverse DWT. Up-sampling is performed in an embodiment of the invention by considering the original input image that is to be up-sampled as a virtual LL sub-band, approximating values for the other sub-bands and then applying the inverse DWT. This is based upon the premise that an inverse DWT, when applied to the four sub-bands generated at any level will result in the recovery of the LL sub-band of the higher level from which it was resolved, or in the case of level 1 sub-bands will result in recovery of the original image. The nature of these coefficients and an architecture for carrying out an inverse DWT in order to achieve up-sampling are discussed below.

Figure 2:
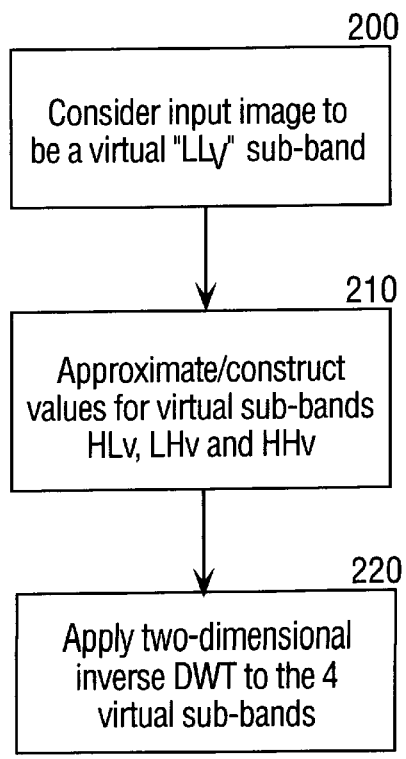
FIG. 2 is a flow diagram of DWT based up-sampling according to one embodiment of the invention.

FIG. 2 is a flow diagram of DWT based up-sampling according to one embodiment of the invention.

In DWT based up-sampling, the first step is to consider the input image as the LL sub-band (step 200). If an image has M rows by N columns of pixels, then these M*N values are considered as a virtual LL sub-band $LL_v$. Then, each virtual sub-band $LH_v$, $HL_v$ and $HH_v$, each of which need to be dimensioned to have M*N values, need to be approximated or constructed (step 210). One way of constructing these sub-band data values may be to analyze/detect the input image for horizontal, vertical and diagonal (see above which direction of edge is appropriate for each sub-band HL, LH and HH) edges and provide non-zero values where edges occur and approximate all other values to zero. In one embodiment of the invention, instead of performing any analysis or detection, all values in the virtual sub-bands $LH_v$, $HL_v$ and $HH_v$, are approximated to zero. If the 9–7 bi-orthogonal splines DWT is considered, then an approximation to zero of all other sub-band data values when the original image or higher level LL sub-band is being recovered through an inverse DWT will result in the recovered image or higher level sub-band being nearly identical (from a human vision perspective) with its original state prior to performing the forward DWT operation. With all of the sub-bands, $LL_v$, $LH_v$, $HL_v$ and $HH_v$ thus constructed, an inverse two-dimensional DWT may be performed to generate the up-scaled image (step 220). The up-scaled image will exhibit better visual clarity than that available through filling, averaging or interpolation based up-sampling techniques. The up-sampling will result will have M*2 rows and N*2 columns of pixel result values, which together constitute the up-sampled image.

Figure 3:
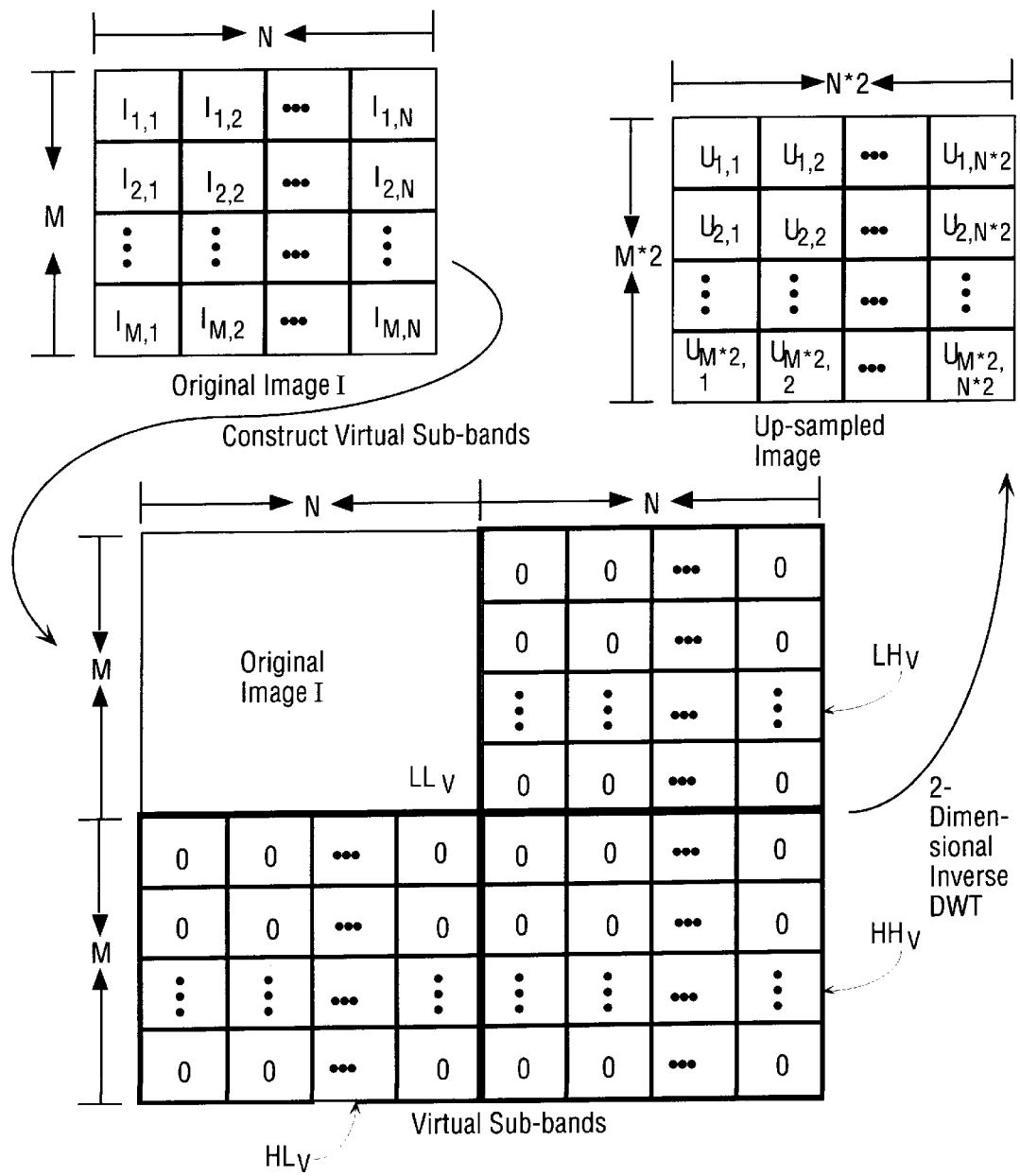
FIG. 3 illustrates DWT based up-sampling according to one embodiment of the invention.

FIG. 3 illustrates DWT based up-sampling according to one embodiment of the invention.

An original image I that has M rows by N columns of pixels in its data set can be up-sampled by a factor of two by following the procedure outlined in FIG. 2. This image is composed of M*N pixels $I_{ij}$ where i, representing the row number of the pixel, ranges from 1 to M and j, representing the column number of the pixel, ranges from 1 to N. Thus, the original image has pixels $I_{1,1}$, $I_{1,2}$, etc. on its first row and pixels $I_{2,1}$, $I_{2,2}$, etc. on its second row and so on. The entire image data set I, according to an embodiment of the invention, will comprise the virtual sub-band $LL_v$. Since data for the other virtual sub-bands that need to be constructed is unavailable (since no real DWT operation was performed), this data must be approximated or constructed. According to an embodiment of the invention, the data values for the other virtual sub-bands may all be approximated to zero. The combined data set for all four sub-bands will have M*2 rows and N*2 columns of pixel values which can then be subjected to a two-dimensional inverse DWT operation. The up-sampled image U will have M*2 rows and N*2 columns of pixels that are virtually identical in terms of perception of the quality and clarity of the image when compared with the original image I. The up-sampled image U is shown to have pixel values of $U_{r,s}$, resulting from the two-dimensional inverse DWT being applied upon the virtual sub-bands, where r, representing the row number of the pixel, ranges from 1 to M*2 and s, representing the column number of the pixel, ranges from 1 to N*2. The data set of all such values $U_{r,s}$ represents a two-to-one scaled-up version of the input image I.

FIG. 4(*a*) shows a basic processing cell for computing a DWT operation. FIG. 4(*a*), which shows the basic processing cell $D_k$ 400, is first described to aid in understanding the architecture of FIG. 4(*b*) which computes a one-dimensional inverse DWT. Referring to FIG. 4(*a*), given a filter coefficients, c (either high-pass or low-pass), an intermediate output $L_k$ is determined by the following expression: $L_k = (p_k+q_k)*c$. In the expressions for $L_k$, the term $q_k$ represents the input virtual sub-band data which is the subject of the inverse DWT, while the term $p_k$-1 refers to an input data propagated from the coupled processing cell from the previous clock cycle and $p_k$ the input data from the current clock cycle, respectively. The input Pk is passed through to output $p_k$-1 from a cell $D_k$ to the previous cell $D_k$-1 in the array. Thus the terms $p_k$ and $p_k$-1 will be referred to hereinafter as "propagated inputs." The basic processing cell 400 of FIG. 4(*a*) may be repeatedly built and selectively coupled to perform the inverse DWT computing architecture as shown in FIG. 4(*b*). This processing cell may be built in hardware by coupling an adder with a multiplier and registers that hold the inverse DWT filter coefficients.

FIG. 4(*b*) is an architecture for a one-dimensional inverse DWT.

A forward DWT may be either one-dimensional or two-dimensional in nature. A one-dimensional forward DWT (one that is performed either row by row or column by column only) would result in only two sub-bands—LFS (Low Frequency Sub-band) and HFS (High Frequency Sub-band). If the direction of the one-dimensional forward DWT is row-wise, then two vertical sub-bands that are dimensioned M rows by N/2 columns are created when applied to an image. The LFS sub-band from a row-by-row forward DWT is a tall and skinny distorted version of the original image. If the direction of the one-dimensional forward DWT is column-wise, then two vertical sub-bands that are dimensioned M rows by N/2 columns are created when applied to an image. The LFS sub-band from a column-by-column forward DWT is a wide and fat distorted version of the original image. When these two one-dimensional forward DWT processes are combined, a two-dimensional forward DWT is embodied. Likewise, when performing the inverse DWT, a row-wise inverse DWT and column-wise inverse DWT can be combined to create a two dimensional inverse DWT, which is desirable in scaling an image proportionally (without axis distortion). Thus, as shown in FIG. 5, the result from a row-wise inverse DWT may be transposed such that another one-dimensional inverse DWT operation upon the result data row-wise will actually be column-wise. The combination of a row-wise and column-wise one-dimensional inverse DWTs will yield a 2 to 1 up-scaled version of the virtual LL sub-band (the original image). Thus, a two-dimensional inverse DWT may be built by repeating or re-utilizing one-dimensional inverse DWT modules, such as that shown in FIG. 4(*b*).

To obtain the up-sampled image data $U_{r,s}$, an intermediate data set, according to an embodiment of the invention, $U'_i$ is first generated by applying a one-dimensional inverse DWT module to the virtually constructed sub-band data. This intermediate data set $U'_i$ is represented by the expression $$U'_i = \sum_n [\overline{h}_{2n-i}a_n + \overline{g}_{2n-i}c_n] = \sum_n \overline{h}_{2n-i}a_n + \sum_n \overline{g}_{2n-i}c_n,$$

where $a_n$ are the constructed (virtual) LFS data and $c_n$ is the constructed (virtual) HFS data. The LFS data may be constructed by concatenating the data in the virtual sub-bands $LL_v$ and $LH_v$, while the HFS data may be constructed by concatenating the $HL_v$ and $HH_v$ viu sub-bands. The inverse and forward 9–7 bi-orthogonal splines DWT have certain symmetric properties which allow for efficient and systolic (i.e., parallel and repeated) processing cells such as those shown in FIG. 4(*a*) to be utilized. The inverse DWT has a set of inverse high-pass filter coefficients $\overline{g}_k$ and a set of inverse low-pass filter coefficients $\overline{h}_k$. The relation of these coefficients in discussed in a related patent application entitled "*An Integrated Systolic Architecture for Decomposition and Reconstruction of Signals Using Wavelet Transforms,*" Ser. No. 08/767,976, filed Dec.17, 1996. We can split the $U'_i$ representation into a sum of two summations:

$$U_1'^{(1)} = \sum_n \overline{h}_{2n-i} a_n, \qquad U_i'^{(2)} = \sum_n \overline{g}_{2n-i} c_n.$$

The even terms of $U_i'^{(1)}$ and $U_i'^{(2)}$, i.e., $U_{2j}'^{(1)}$ and $U_{2j}'^{(2)}$ for $j=0, 1, \ldots, n/2-1$ using these filter coefficients are expanded as:

$$U_0'^{(1)} = \overline{h}_0 a_0 + \overline{h}_2 a_1, \qquad U_0'^{(2)} = \overline{g}_0 c_0 + \overline{g}_2 c_1 + \overline{g}_4 c_2,$$

$$U_2'^{(1)} = \overline{h}_{-2} a_0 + \overline{h}_0 a_1 + \overline{h}_2 a_2, \qquad U_2'^{(2)} = \overline{g}_{-2} c_0 + \overline{g}_0 c_1 + \overline{g}_2 c_2 + \overline{g}_4 c_3,$$

$$U_4'^{(1)} = \overline{h}_{-2} a_1 + \overline{h}_0 a_2 + \overline{h}_2 a_3, \qquad U_4'^{(2)} = \overline{g}_{-2} c_1 + \overline{g}_0 c_2 + \overline{g}_2 c_3 + \overline{g}_4 c_4,$$

$$\vdots$$

$$U_{n-6}'^{(1)} = \overline{h}_{-2} a_{n/2-4} + \overline{h}_0 a_{n/2-3} + \overline{h}_2 a_{n/2-2}, \quad U_{n-6}'^{(2)} = \overline{g}_{-2} c_{n/2-4} + \overline{g}_0 c_{n/2-3} + \overline{g}_2 c_{n/2-2} + \overline{g}_4 c_{n/2-1},$$

$$U_{n-4}'^{(1)} = \overline{h}_{-2} a_{n/2-3} + \overline{h}_0 a_{n/2-2} + \overline{h}_2 a_{n/2-1}, \quad U_{n-4}'^{(2)} = \overline{g}_{-2} c_{n/2-3} + \overline{g}_0 c_{n/2-2} + \overline{g}_2 c_{n/2-1},$$

$$U_{n-2}'^{(1)} = \overline{h}_{-2} a_{n/2-2} + \overline{h}_0 a_{n/2-1}, \qquad U_{n-2}'^{(2)} = \overline{g}_{-2} c_{n/2-2} + \overline{g}_0 c_{n/2-1}.$$

The inverse 9–7 bi-orthogonal splines DWT filter coefficients like their forward counterparts have certain symmetric properties allowing associative grouping. One property of the inverse high-pass coefficients is $\overline{g}_n = (-1)^n h_{1-n}$, where hk are forward DWT coefficients. Additionally since the forward coefficients have the property $h_n = h_{-n}$, the inverse high-pass coefficients also have a property such that $\overline{g}_n = (-1)^n h_{n-1}$. Thus, for n=0, $\overline{g}_o = h_{-1}$. For n=2, since $\overline{g}_2 = h_1$ and $h_{-1} = \overline{g}_0$, then $\overline{g}_2 = \overline{g}_0$. Likewise, for n=4, $\overline{g}_4 = h_3 = \overline{g}_{-2}$. The inverse low-pass coefficients have the property $\overline{h}_n = \overline{h}_{-n}$, such that $\overline{h}_2 = \overline{h}_{-2}$. Thus, the even-numbered outputs $U'_{2j}$ can be computed using only four coefficients, $\overline{h}_0, \overline{h}_2, \overline{g}_2$ and $\overline{g}_4$. Similarly, for odd-numbered outputs $U'_{2j-1}$, it can be shown by the same filter properties discussed above that only five coefficients, $\overline{h}_3, \overline{h}_1, \overline{g}_5, \overline{g}_3$ and $\overline{g}_1$ can be used.

The relationships described above show how an inverse DWT may be computed. The architecture in FIG. 4(b) for computing the inverse DWT consists of two input sequences $a_i$ and $c_i$, which represent the high-frequency sub-band and the low-frequency sub-band inputs, respectively. The inverse architecture receives two inputs and produces one output. This architecture is not unitary in that the odd-numbered outputs, i.e., $U'_1, U'_3, U'_5. \ldots$, require five processing cells, one for each coefficient, whereas the even-numbered outputs, i.e., $U'_1, U'_2, U'_4. \ldots$, require only four processing cells. The odd-numbered outputs may be generated and even-numbered outputs may be generated on alternating clock cycles, odd and even, respectively.

Thus, the inverse DWT architecture must be composed of two distinct blocks—an even output generating block 402 and an odd output generating block 450. Even output generating block 402 is further composed of two sub-circuits—an even high frequency sub-band sub-circuit (HFS) 410 and an even low frequency sub-band sub-circuit (LFS) 420. Even HFS sub-circuit 410 consists of two processing cells 415 and 417 each of which are composed of a multiplier and an adder. The processing cells 415, 417, 425 and 427 operate similar to the basic processing cell 400 shown in FIG. 4(a) accepting two inputs, summing them and then multiplying that sum by a coefficient. For instance, processing cell 415 outputs a term such that $a_i$ is first added to the propagated input from processing cell 417, with that sum multiplied by $\overline{h}_2$. Likewise for low frequency sub-band circuit 420, processing cell 425 outputs a term to adder/controller 430 which is the product of $\overline{g}_4$ and the sum of the input $c_i$ and the propagated input from processing cell 427. Processing cell 417 receives as one input 0 and as the other input $a_{i-1}$ since delay element 412 holds the value given it on the previous clock, transmitting it on the next clock cycle.

Even output generating block operates as follows. At i=0, $a_o$ is propagated to delay 412, and $c_0$ to delay 422. Though $a_0$ and $c_0$ are also input to cells 415 and 425, respectively, adder/controller 430 waits until the third clock cycle to output $x_0$ and have non-zero propagated inputs. At i=0, cells 417 and 427 have outputs of 0, since initial values released by delays 412, 424 and 422 are set at zero. At i=1, delay 412 releases ao to the $p_i$ input of cell 417 and $a_1$ is held at delay 412 and input to cell 415. As a result, cell 415 generates the term $\overline{h}_2 a_1$ and cell 417 generates $\overline{h}_0 a_0$. These outputs are sent to adder/controller 430 but are held (latched) until the next clock i=2. At i=1, though cells 425 and 427 generate the terms $c_1 \overline{g}_4$ and $c_0 \overline{g}_2$, respectively, these terms are ignored (cleared) by adder/controller 430 since according to the relationship defined above, the first output $U'_0$ utilizes the $C_2$ input data.

Figure 4A:
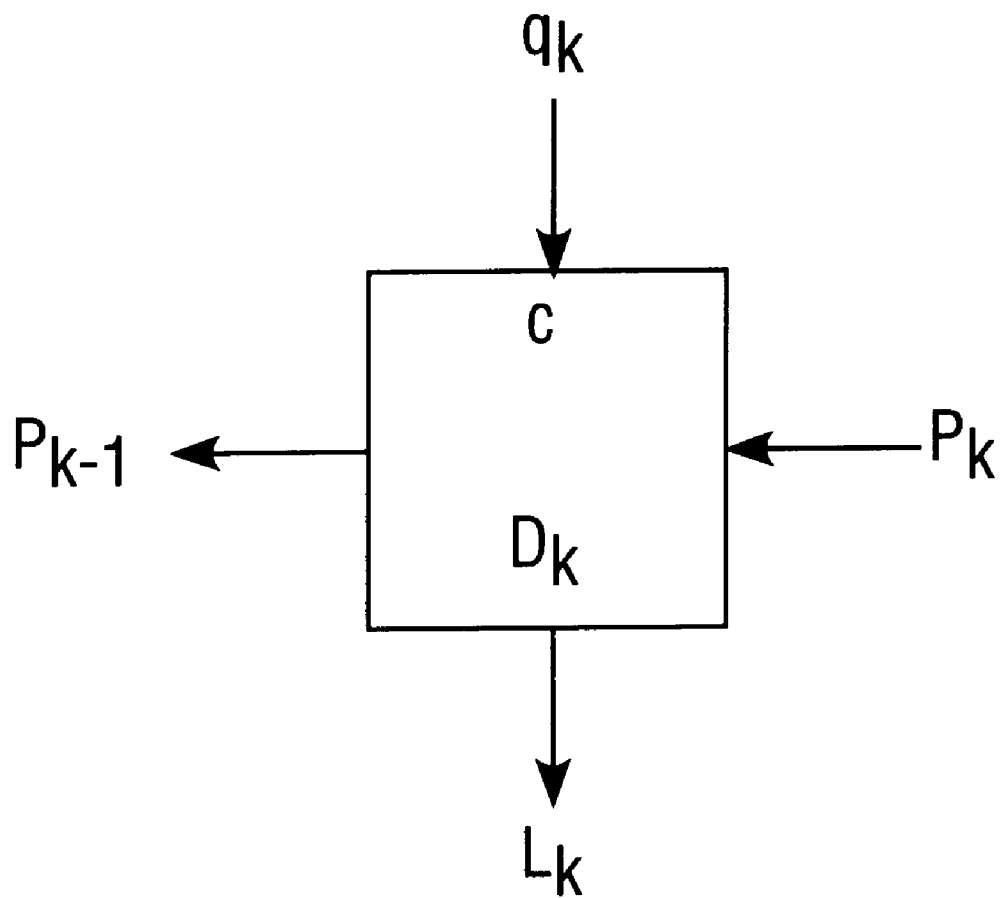
FIG. 4(a) shows a basic processing cell for computing a DWT operation.
Figure 4B:
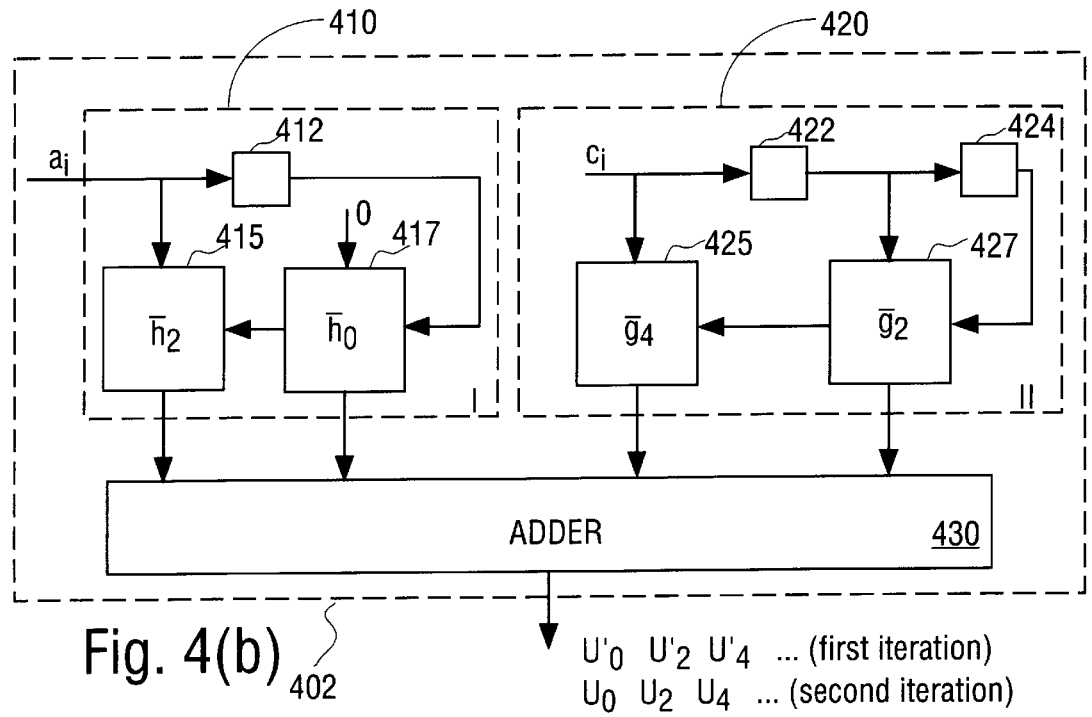
FIG. 4(b) is an architecture for a one-dimensional inverse DWT.
Figure 5:
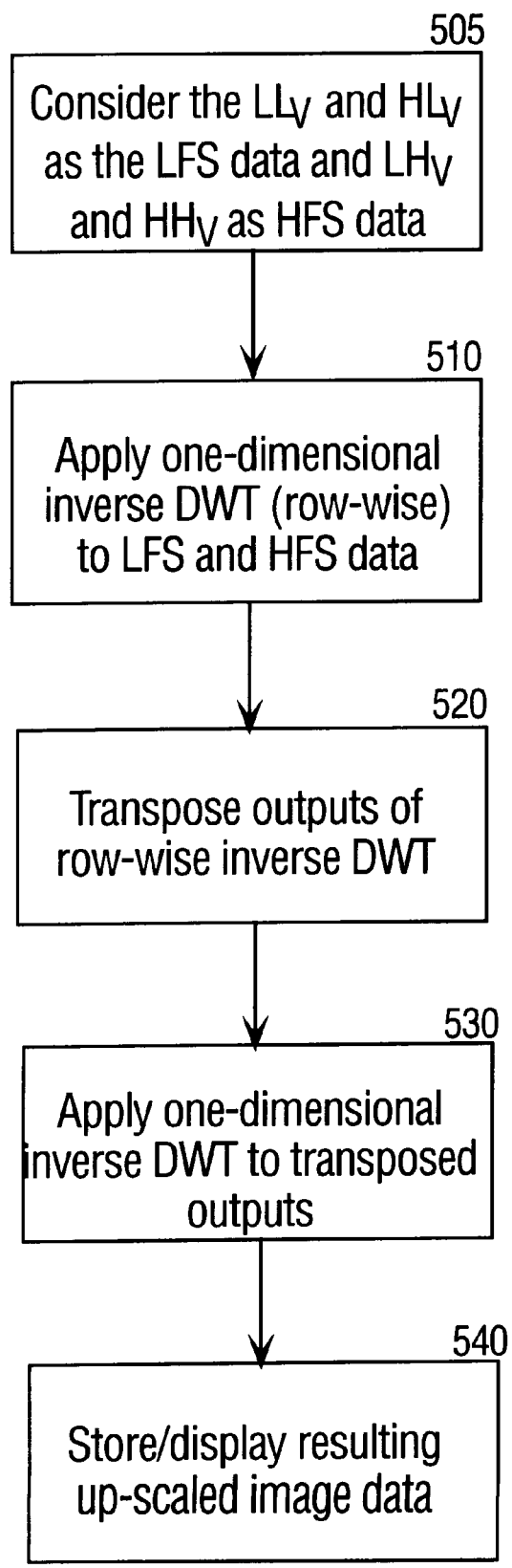
FIG. 5 is a flow diagram of one embodiment of the invention.

At i=2, the third clock cycle, delay 424 releases $c_0$ to the $p_i$ (propagated) input of cell 427 and delay 422 releases $c_1$ to the $q_i$ input of cell 427 (for a description of $q_i$ and $p_i$, see FIG. 4(a) and associated text). Thus, cell 427 generates the term $(c_1 + c_0) \overline{g}_2$. Cell 425 generates $c_2 \overline{g}_4$. As described earlier, the outputs of cells 415 and 417 from the previous clock were held at adder/controller 430 and are now summed, at i=2 with the terms generated by cells 425 and 427. Again, at i=2, even though cells 415 and 417 generate terms $(a_0 + a_2) \overline{h}_2$ and $a_1 \overline{h}_0$, respectively, these terms are held one clock cycle. Instead, the i=2 outputs of cells 425 and 427 which are $C_2 \overline{g}_4$ and $(c_0 + c_1) * \overline{g}_2$, respectively, are summed with the i=1 outputs of cells 415 and 417 which are $\overline{h}_0 a_0$ and $\overline{h}_2 a_1$. Hence, adder/controller 430 generates the first output $U'_0 = \overline{h}_0 a_0 + \overline{h}_2 a_1 + c_0 \overline{g}_2 + c_1 \overline{g}_2 c_2 \overline{g}_4$.

Figure 4C:
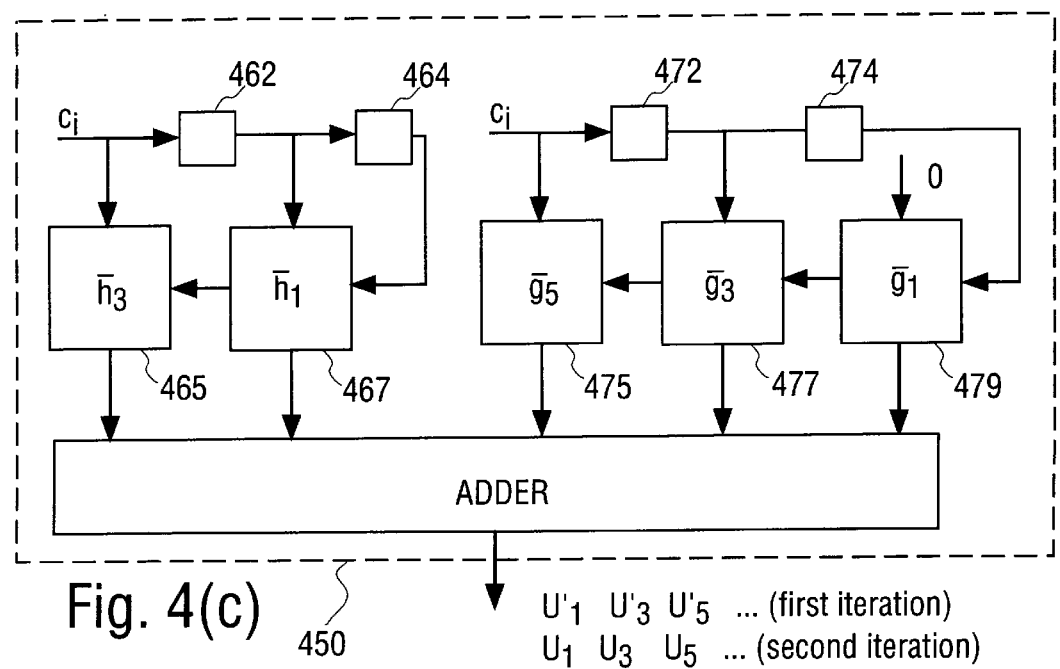
FIG. 4(c) is an architecture for a one-dimentional inverse DWT having odd cell output.

Thus, for each clock cycle i, after i=2 (the third clock cycle), adder/controller 430 receives current outputs of sub-circuit 420 and adds them to the previous clock's outputs from sub-circuit 410. Additionally, adder/controller 430 receives the current output of sub-circuit 410, holding them until the next clock cycle. FIG. 4(c) shows an odd output generating block 450 which requires five processing cells—465, 467, 475, 477 and 479. The processing cells 465, 467, 475, 477 and 479 operate similarly to the processing cell 400 shown in FIG. 4(a). The delay elements 462, 464, 472 and 474 hold their inputs for one clock cycle and release them on the next clock cycle. Each cell has an adder and multiplier and receives a propagated input from the cell to which it is connected.

Odd output generating block 450 operates as follows. At i=0, $a_0$ is propagated to cell 465 and is held on clock cycle at delay 462, while cell 475 receives $c_0$. At i-1, delay 462 releases $a_0$ to cell 467, while delay 472 release $c_0$ to cell 477.

Also, at i=1 and $c_1$ are input to cells 465 and 475, respectively. At i=2, cell 465 receives $a_2$, cell 467 receives $a_1$ as its $q_i$ and receives $a_0$ as its $p_i$ input. Thus, cell 465 generates a term $a_2\bar{h}_3$ and cell 467 generates $(a_1+a_0)\bar{h}_1$. These outputs are sent to adder/controller 480 but are held for one clock cycle before being summed with the outputs of cells 475, 477 and 479. At i=2, the outputs of cells 475, 477 and 479 are ignored by adder/controller 480.

At i=3, $c_3$ is input to cell 475, cell 477 receives $c_2$ from the delay 472, cell 479 receives as propagated input $c_i$, and cell 477 receives as its propagated input, $c_0$. Thus, cell 475 generates the term $c_3\bar{g}_5$, cell 477 generates the term $(c_0+c_2)*\bar{g}_3$, and cell 479 generates $c_1\bar{g}_1$. These outputs are received by adder/controller 480 which adds the i=3 outputs of cells 475, 477 and 479 with the latched, i=2 outputs of cells 465 and 467 from the previous clock cycle. Hence, adder/controller 480 generates the second output (the first odd output) $x_1 = \bar{h}_1a_0 + \bar{h}_1a_1 + \bar{h}_3a_2 + \bar{g}_3c_0 + \bar{g}_3c_2 + \bar{g}_5c_3 + \bar{g}_1c_1$.

Thus, for each clock cycle i, after i=3, (the fourth clock cycle), adder/controller 480 receives the current outputs of cells 475, 477 and 479 and adds them to the previous clock cycle's outputs of cells 465 and 467. Additionally, adder/controller 480 receives the current clock's outputs of cells 465 and 467 holding them until the next clock cycle. With a set of result data $U'_1$ thus obtained, these values can be transposed and fed back in as inputs for another iteration of the one-dimensional DWT. The intermediate output $U'_0$ corresponds to data result positioned at row 1 and column 1 in the up-scaled image space, while $U'_1$ corresponds to a data result positioned at row 1 and column 2, since the input data from the LFS and HFS are fed into the architecture of FIG. 4(*b*) in a row-wise manner. The last entry of the first row in the up-scaled image space would be $U'_{N*2-1}$ while $U'_{N*2}$ is positioned in the second row and first column of the M*2 row, N*2 column up-scaled image space.

Once all the intermediate data $U'_i$, where i ranges from 0 to M*2*N*2−1, is generated, these values may be transposed by a matrix transpose circuit, which one of ordinary skill in the art can readily implement, such that the row-wise data is now column wise. The transposed data set $TU'_i$ is then considered to be the input data for another iteration of the one-dimensional inverse DWT, fed-back into a module with architecture identical or similar to FIG. 4(*b*). The result of applying a one-dimensional DWT to the data set $TU'_i$ is $U_i$ (or $U_{r,s}$ in row-column representation), the up-scaled image data. This process is summarized in FIG. 5.

FIG. 5 is a flow diagram of one embodiment of the invention.

The methodology for discrete wavelet transform (DWT) based up-sampling of an image involves a step-wise application of the inverse DWT. Once the four virtual sub-bands are constructed, then the first step in implementing a two-dimensional inverse DWT is to consider the $LL_v$ and $HL_v$ sub-bands as the LFS data, and the $LH_v$ and $HH_v$ sub-bands as the HFS data for the one-dimensional inverse DWT (block 505). An inverse DWT in one-dimension is applied, row-rise to the LFS and HFS data (block 510). The M*N*4 outputs resulting from this first iteration of the inverse DWT (labeled $U'_i$ in the FIGS. 4(*b*)–4(*c*) example) may be stored into an image array which may be a memory or other storage means. Next, the outputs of the row- wise DWT are transposed so that columns become rows and rows become columns in the intermediate output data $U'_i$ (block 520). This transposing may be performed simultaneously with the storing of the intermediate output result $U'_i$. Next, the transposed data is subjected to the one-dimensional inverse DWT of block 510 but will operate in a column-wise fashion since the data has been transposed. A row-wise DWT on the transposed data is essentially column-wise. The resulting data set $U_i$ from block 530 are the pixel values of a 2:1 up-scaled version of the original image. This data set $U_i$ may be stored or displayed as an up-scaled image (block 540). In some instances, normalization may be needed to convert a larger data value that may occur in the inverse DWT operation. Normalization of data result $U_i$ may be achieved by the following formula: $(U_i-\min)/(\max-\min)*K$, where min is the minimum result value, max, the maximum result value and K the maximum desired normalized value. For instance, if an 8-bit value is desired, K may be set to 255.

Figure 6:
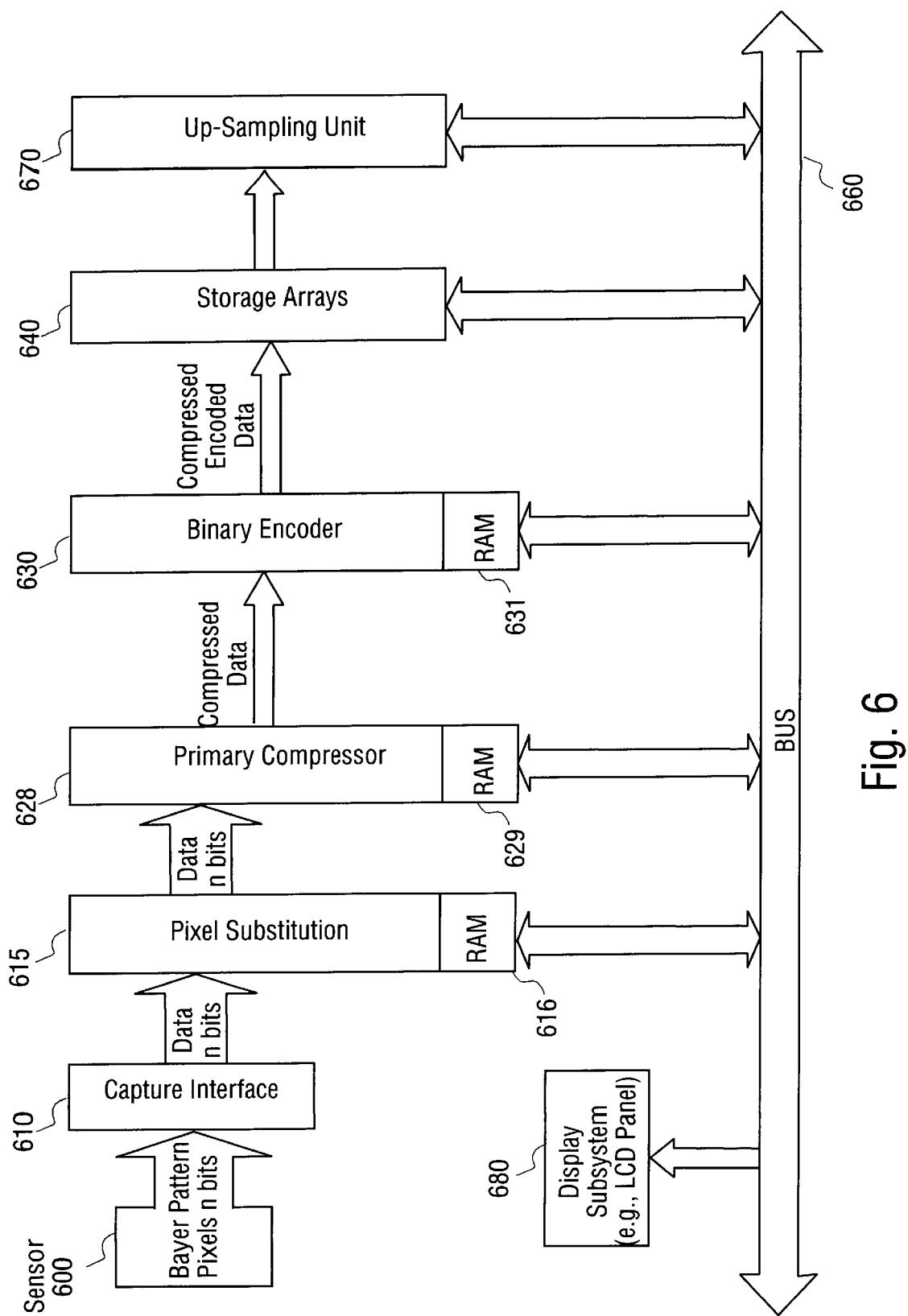
FIG. 6 is a block diagram of an image processing apparatus according to an embodiment of the invention.

FIG. 6 is a block diagram of an image processing apparatus according to an embodiment: of the invention.

FIG. 6 is a block diagram of internal image processing components of an imaging devic(e incorporating at least one embodiment of the invention including a DWT-based up-sampling unit. In the exemplary circuit of FIG. 6, a sensor 600 generates pixel components which are color/intensity values from some scene/environment. The n-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three (or four if G1 and G2 are considered separately) color planes and may form together a Bayer pattern raw image. Capture interface 610 resolves the image generated by the sensor and assigns intensity values to the individual pixels. The set of all such pixels for the entire image is in a Bayer pattern in accordance with typical industry implementation of digital camera sensors.

It is typical in any sensor device that some of the pixel cells in the sensor plane may not respond to the lighting condition in the scene/environment properly. As a result, the pixel values; generated from these cell may be defective. These pixels are called "dead pixels." The "pixel substitution" unit 615 replaces each dead pixel by the immediate previously valid pixel in the row. A RAM 616 consists of the row and column indices of the dead pixels, which are supplied by the sensor. This RAM 616 helps to identify the location of dead pixels in relation to the captured image.

A primary compressor 628 receives companded sensor image data and performs image compression such as the DWT based compression, JPEG (Joint Photographic Experts Group) or Differential Pulse Code Modulation. A RAM 629 can be used to store DWT coefficients both forward and inverse. Primary compressor 628 can be designed to provide compressed channel by channel outputs to an encoding/storage unit 630. Encoding/storage unit 630 can be equipped to carry out a variety of binary encoding schemes, such as Modified Huffinan Coding (using tables stored in RAM 631) or may store directly the compressed image to storage arrays 640.

An image up-sampling unit 670 can be coupled through bus 660 to the storage arrays 640 to up-sample the image, compressed or direct from the sensor for display or other purposes. Image up-sampling unit 670 can be designed to include DWT based up-sampling as described above and may incorporate the modules such as the architecture shown in FIGS. 4(*b*)–4(*c*) and a transpose circuit. Alternatively, where the compressor unit 628 is designed for DWT based image compression, then, an integrated forward and inverse DWT architecture may be incorporated in the compressor 628 such that up-sampling unit 670 initiates the inverse mode of the architecture and sends virtually constructed sub-band data from storage arrays 640 to compressor unit 628. The imaging unit may contain an on-board display sub-system 680 such as an LCD panel coupled to bus 660. One application of up-sampling unit 670 is to provide up-sampled image data to display sub-system 680. The up-sampling unit 670 may receive data from, any stage of the image processing flow, even directly from the sensor prior to image compression if desired. Advantageously, the up-sampled image will exhibit a very sharp and clear version of the compressed image.

Each of the RAM tables 616, 629 and 631 can directly communicate with a bus 660 so that their data can be loaded and then later, if desired, modified. Further, those RAM tables and other RAM tables may be used to store intermediate result data as needed. When the data in storage arrays 640 or from up-sampling unit 670 is ready to be transferred external to the imaging apparatus of FIG. 6 it may be placed upon bus 660 for transfer. Bus 660 also facilitates the update of RAM tables 616, 629 and 631 as desired.

Figure 7:
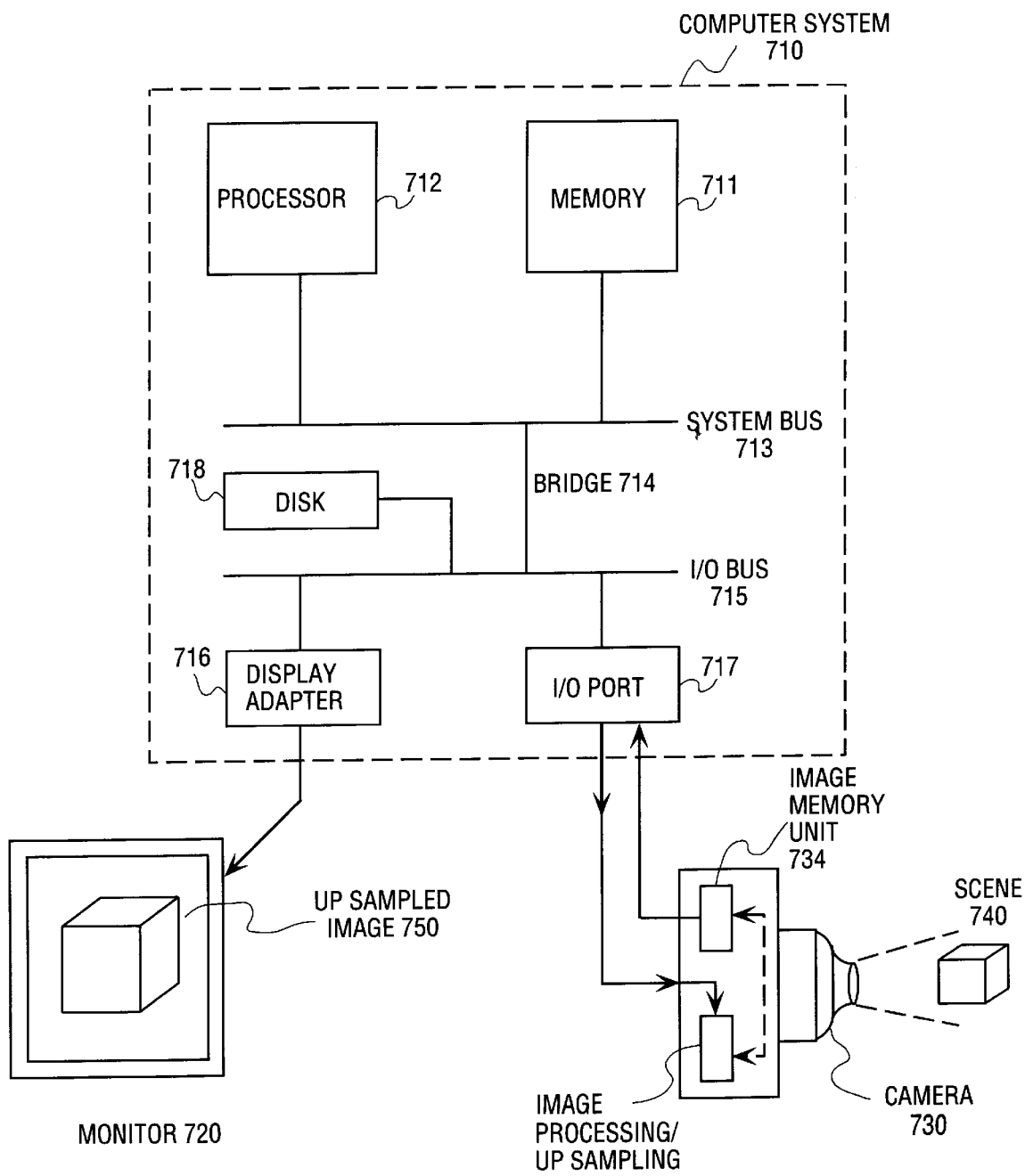
FIG. 7 is a system diagram of one embodiment of the invention.

FIG. 7 is a system diagram of one embodiment of the invention. Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture a sensor image of an scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710 even if up-sampled is enhanced in that the loss of image features due to traditional up-sampling techniques is greatly mitigated by better preserving edge features in the DWT based up-sampling process. In most digital cameras that can perform still imaging, images are stored first and downloaded later. This allows the camera 730 to capture the next object/scene quickly without additional delay. However, in the case of digital video camera, especially one used for live videoconferencing, it is important that images not only be quickly captured, but quickly processed and transmitted out of camera 730. The invention in various embodiments, particularly in scaling operation, is well-suited to providing good fast throughput to other parts of the image processing circuit 732 so that the overall speed of transmitting image frames is increased. Image up-sampling is carried out within the image processing circuit 732 in this embodiment of the invention. After the image is up-sampled, it may also be passed to a display system on the camera 730 such as an LCD panel, or to a display adapter 76 on the computer system. The procedure of DWT based up-sampling may be applied to any image whether captured by camera 730 or obtained elsewhere. Since the inverse and forward DWT are essentially filtering operations, one of ordinary skill in the art may program computer system 710 to perform DWT based up-sampling. This may be achieved using a processor 712 such as the Pentium® processor (a product of Intel Corporation) and a memory 711, such as RAM, which is used to store/load instructions, addresses and result data as needed. Thus, in an alternative embodiment, up-sampling may be achieved in software application running on computer system 710 rather than directly in hardware. The application(s) used to generate scaled-up image pixels after download from camera 730 may be from an executable compiled from source code written in a language such as C++. The instructions of that executable file, which correspond with instructions necessary to scale the image, may be stored to a disk 718, such as a floppy drive, hard drive or CD-ROM, or memory 711. Further, the various embodiments of the invention may be implemented onto a video display adapter or graphics processing unit that provides up-sampling or image zooming.

Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When an image, such as an image of a scene 740, is captured by camera 730, it is sent to the image processing circuit 732. Image processing circuit 732 consists of ICs and other components which can execute, among other functions, the scaling up of the captured or compressed image. The scaling operation, as described earlier, may utilize image memory unit to store the original image of the scene 740 captured by the camera 730. Further, this same memory unit can be used to store the up-sampled image data. When the user or application desires/requests a download of images, the scaled (and/or compressed) images stored in the image memory unit are transferred from image memory unit 734 to the I/O port 717. I/O port 717 uses the bus-bridge hierarchy shown (I/O bus 715 to bridge 714 to system bus 713) to temporarily store the scaled and compressed image data into memory 711 or, optionally, disk 718.

The images are displayed on computer system 712 by suitable application software (or hardware), which may utilize processor 712 for its processing. The image data may then be rendered visually using a display adapter 716 into a rendered/scaled image 750. The scaled image is shown as being twice in size of the original captured scene. This is desirable in many image applications where the original sensor capture size of a scene. In a videoconferencing application the image data in its compressed and scaled form may be communicated over a network or communication system to another node or computer system in addition to or exclusive of computer system 710 so that a videoconferencing session may take place. Since up-sampling and compression are already achieved on-camera in one embodiment of the invention, it may be possible to implement a communication port in camera 730 that allows the image data to be transported directly to the other node(s) in a videoconferencing session. Wherever a user of computer system 710 also desires to see his own scene on monitor 720, image data that is scaled-up may be sent both to computer system 710 and transported over a network to other nodes. As discussed earlier, the scaled image will have more visually accurate edge features than typical in scaling operations due to the enhancement in the scaling process by specifically and carefully selecting the DWT coefficients. The end result will be a higher quality rendered up-sampled image 750 that displayed onto monitor 720 or other nodes in a videoconferencing session as compared with even typical up-sampling methods.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

constructing virtual Discrete Wavelet Transform (DWT) sub-bands from an image by approximation without performing a DWT, wherein a virtual LL sub-band is approximated to an original image pixel width and height dimensions without reduction; applying an inverse DWT upon said virtual sub-bands, the result of said inverse DWT representing an up-sampled version of said image, said up-sampled version of said image having increased pixel width and height dimensions of said original image.

2. A method according to claim 1 wherein said virtual sub-bands include said LL sub-band, an HL sub-band, an LH sub-band and an HH sub-band.

3. A method according to claim 2 wherein said LL sub-band has the same dimension as said image.

4. A method according to claim 2 wherein said HL sub-bands, said LH sub-bands and said HH sub-bands are approximated by zero pixel values.

5. A method according to claim 2 wherein said inverse DWT performed is a two-dimensional inverse DWT.

6. A method according to claim 5 wherein performing said two-dimensional inverse, DWT comprises:

applying a one-dimensional inverse DWT to said virtual sub-bands in a row-wise fashion; transposing said data resulting from said first DWT such that columns become rows and rows become columns; and applying again said one-dimensional inverse DWT to said transposed data, the result of applying said one-dimensional inverse DWT to said transpose data being up-scaled image data.

7. A method according to claim 2 wherein said image is doubled in size in up-sampled version.

8. An apparatus comprising:

an interface to communicate image data; and an up-sampling unit, said up-sampling unit coupled to said interface to receive said image data, said up-sampling unit constructiog virtual sub-band input data from said image data by approximation, wherein an LL sub-band is approximated to original image pixel width and height dimensions without reduction, said up-sampling unit performing an inverse Discrete Wavelet Transform (DWT) upon said input data generating an up-sampled image therefrom, said up-sampled image having increased pixel width and height dimensions of said original image; and an adder coupled to a processing cell to receive and selectively add said intermediate output.

9. An apparatus according to claim 8 wherein said up-sampling unit comprises:

a first up-sampled data output generation; and a second up-sampled data output generation, said first and second output generators providing their respective outputs in an alternating fashion.

10. An apparatus according to claim 9 wherein said first generation and said second generation each comprise:

a plurality of processing cells, each processing cell capable of generating an intermediate inverse DWT output from said input data; and X an adder coupled to said processing cell to receive and selectively add said intermediate outputs.

11. An apparatus according to claim 10 wherein each said output generation further comprises:

delay elements selectively coupled to said processing cells, said delay elements delaying selectively outputs to said processing cells.

12. An apparatus according to claim 10 wherein each said processing cell is configured to multiply an inverse DWT coefficient by a sum of selected ones of said input data.

13. An apparatus according to claim 9 configured to couple to an imaging system.

14. An apparatus according to claim 13 wherein said imaging system is a digital camera.

15. An article comprising:

a computer readable medium having instructions stored thereon, which when executed perform:

constructing virtual Discrete Wavelet Transform (DWT) sub-bands from an image by approximation without performing a DWT, wherein a virtual LL sub-band is approximated to an original image pixel width and height dimensions without reduction;

applying an inverse DWT upon said virtual sub-bands, the result of said inverse DWT representing an up-sampled version of said image, said up-sampled version of said image having increased pixel width and height dimensions of said original image.

16. An article according to claim 15, wherein virtual sub-bands include said LL sub-band, an HL sub-band, an LH sub-band and an HH sub-band.

17. An article according to claim 16, wherein said LL sub-band has the same dimension of pixels as said image.

18. An article according to claim 16 wherein said HL sub-bands, said LH sub-bands and said HH sub-bands are approximated by zero pixel values.

19. An article according to claim 16 wherein said image is doubled in size in an up-sampled version.

20. An article according to claim 16 wherein said inverse DWT performed is a two-dimensional inverse DWT.

21. A method comprising:

constructing virtual Discrete Wavelet Transform (DWT) sub-bands from an image by approximation without performing a DWT, wherein a virtual LL sub-band is approximated to original image dimension in pixels without reduction, wherein said virtual sub-bands include said LL sub-band, an HL sub-band, an LH sub-band and an HH sub-band; and applying an inverse DWT upon said virtual sub-bands, the result of said inverse DWT representing an up-sampled version of said image, wherein said inverse DWT performed is a two-dimensional inverse DWT, performing said two-dimensional inverse DWT further comprises:

applying a one-dimensional inverse DWT to said virtual sub-bands in a row-wise fashion;

transposing said data resulting from said first DWT such that columns become rows and rows become columns; and applying again said one-dimensional inverse DWT to said transposed data, the result of applying said one-dimensional inverse DWT to said transpose data being up-scaled image data.

22. A method according to claim 21 wherein said LL sub-band has the same dimension as said image.

23. A method according to claim 21 wherein said HL sub-bands, said LH sub-bands and said HH sub-bands are approximated by zero pixel values.

24. A method according to claim 21, wherein said image is doubled in size in up-sampled version.

25. An apparatus comprising:

an interface communicating image data; and an up-sampling unit, said up-sampling unit coupled to said interface to receive said image data, said up-sampling unit constructing virtual sub-band input data from said image data by approximation, wherein an LL sub-band is approximated to original image dimension in pixels without reduction, said up-sampling unit configured to perform an inverse Discrete Wavelet Transform (DWT) upon said input data generating an up-sampled image therefrom; and an adder coupled to a processing cell to receive and selectively add intermediate outputs; wherein said up-sampling unit comprises:

a first up-sampled data output generation; and a second up-sampled data output generation, said first and second output generators providing their respective outputs in an alternating fashion, said first generation and said second generation each comprise:

a plurality of processing cells, each processing cell capable of generating an intermediate inverse DWT output from said input data; and an adder coupled to said processing cell to receive and selectively add said intermediate outputs, each said output generation comprises:

delay elements selectively coupled to said processing cells, said delay elements delaying selectively outputs to said processing cells.

26. An apparatus according to claim 25 wherein each said processing cell multiplies an inverse DWT coefficient by a sum of selected ones of said input data.

27. An apparatus according to claim 25 coupled to an imaging system.

28. An apparatus according to claim 26 wherein said imaging system is a digital camera.

* * * * *